MAGNETIC RECORD-READ CONTROL PROCESS AND APPARATUS

Filed March 3, 1967 6 Sheets-Sheet 1

Jan. 26, 1971 H. SCHLOSSBAUER 3,559,192

MAGNETIC RECORD-READ CONTROL PROCESS AND APPARATUS

Filed March 3, 1967 6 Sheets-Sheet 3

Fig. 7

| EXAMPLE | GATE X2 | | | GATE X3 | | | | GATE X4 | | | | | GATE Y1 | | | |
|---|---|---|---|---|---|---|---|---|---|---|---|---|---|---|---|---|
| | INPUT | | OUTPUT | INPUT | | | OUTPUT | INPUT | | | | OUTPUT | INPUT | | | OUTPUT |
| | MK | $\overline{D}$ | | C | $\overline{MK}$ | $\overline{D}$ | | $\overline{C}$ | $\overline{MK}$ | D | B | | X2 | X3 | X4 | |
| 1 | 0 | 0 | 1 | 0 | 1 | 0 | 0 | 1 | 1 | 1 | 0 | 0 | 1 | 0 | 0 | 0 |
| 2 | 0 | 1 | 0 | 0 | 1 | 1 | 0 | 1 | 1 | 0 | 0 | 0 | 0 | 0 | 0 | 1 |
| 3 | 1 | 0 | 0 | 0 | 0 | 0 | 1 | 1 | 0 | 1 | 0 | 0 | 0 | 1 | 0 | 0 |
| 4 | 1 | 0 | 0 | 0 | 0 | 1 | 0 | 1 | 0 | 0 | 0 | 0 | 0 | 0 | 0 | 1 |
| 5 | 1 | 1 | 0 | 1 | 0 | 1 | 0 | 0 | 0 | 0 | 0 | 1 | 0 | 0 | 1 | 0 |
| 6 | 1 | 0 | 0 | 1 | 0 | 0 | 0 | 0 | 0 | 1 | 0 | 0 | 0 | 0 | 0 | 1 |

United States Patent Office 3,559,192

Patented Jan. 26, 1971

3,559,192

MAGNETIC RECORD-READ CONTROL PROCESS AND APPARATUS

Hubert Schlossbauer, Krailling, Germany, assignor to Siemens Aktiengesellschaft, Munich, Germany Filed Mar. 3, 1967, Ser. No. 620,443
Claims priority, application Germany, Mar. 4, 1966, S 102,355
Int. Cl. G11b 5/36, 27/36
U.S. Cl. 340—174.1 12 Claims

ABSTRACT OF THE DISCLOSURE

A magnetic record-read apparatus and process having supervisory control circuitry to indicate whether information is recorded correctly. Information bits are recorded on successive segments of a premagnetized magnetic tape. Each recorded bit is read and supervisory control signals are thereby produced, which are compared to the recording current, to determine if the information bit has been correctly recorded. Before advancing the magnetic tape to the next segment, an incorrectly recorded bit may be corrected. A vibrator device is utilized in operative contact with the magnetic tape to vibratably move a portion of the magnetic tape segment over the magnetic record-read head after the bit has been recorded, to generate the supervisory control signals. Evaluator means are utilized to evaluate the supervisory control signals and logic circuitry considers the evaluation with respect to the input to the recording head, to determine whether or not the information bit is correctly recorded. When the bit is recorded correctly, or when it is recorded incorrectly and is subsequently corrected, the tape is advanced to record the next information bit on the successive segment.

CROSS REFERENCE TO RELATED APPLICATION

Applicant claims priority from German application Ser. No. S 102,355, filed Mar. 4, 1966, in Germany.

FIELD OF THE INVENTION

The invention concerns a process and apparatus for successively recording bits of information on magnetic tape segments during individual time intervals, and particularly for developing supervisory control signals to determine if the recorded information is correct. The invention particularly concerns developing the supervisory control signals within each time interval, to enable correction of an incorrectly recorded bit of information on the same tape segment, before the tape is advanced to the successive tape segment.

DESCRIPTION OF THE PRIOR ART

The prior art teaches recording successive information bits at separate time intervals, and reading the signals to develop supervisory signals to determine whether the bit has been correctly recorded. During the next successive forward step or time interval, the incorrectly recorded bit can be corrected. However, this correction process is usable only in the "return to bias" recording process, wherein the magnetic tape is returned to a predetermined magnetic bias reference, after each bit is recorded.

With reference to the "NRZ-mark" or non-return to zero recording process, in which successive bits of information are recorded, and in which magnetization polarization reversal occurs only when a binary 1 is recorded, the prior art does not provide for the correction of a recorded bit on the same magnetic tape segment, or before the tape is advanced to the successive tape segment.

SUMMARY OF THE INVENTION

These and other objections and defects in the prior art, are solved by this invention which provides for generating supervisory control signals to determine if recorded information is correct, and to effect correction of an erroneously recorded bit of information on the same magnetic tape segment. The magnetic tape is advanced successively in steps, and bits of information are individually recorded during each successive step. During the recording and supervisory reading of the recorded bit, the magnetic tape is substantially stationary. It is not advanced to the next step, until it is determined that the bit of information has been correctly recorded, or if it has not, until a correction has been effected.

A vibrator is operatively associated with the magnetic tape, to vibrate a portion of the recorded bit over the magnetic record-read head at supersonic frequencies to develop the supervisory control signals. The supervisory control signals are then evaluated by associated electronic circuits to determine if magnetic polarization reversal of successive tape segments has occurred. Associated logic circuitry is utilized to compare the indications produced by the evaluator, to the recording currents, to determine if an error has been made in recording the bit. If an error has been made, the magnetic tape segment can then be remagnetized to effect the correct magnetic indication of bit information. In this manner, it is possible to quasi-statically scan a magnetic flux flow variation in the stop phase of magnetic tape movement, to determine correctness of the recorded information, and to effect corrections when required.

BRIEF DESCRIPTION OF THE DRAWINGS

FIG. 7 is a table showing the binary states of the NOR gates during particular examples of information bits being recorded.

DETAILED DESCRIPTION OF THE INVENTION

Figure 1:
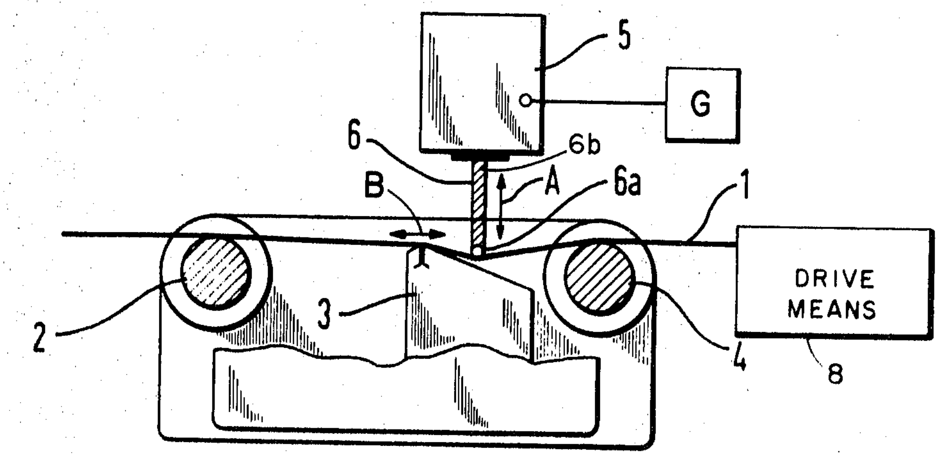
FIG. 1 is a sectional view of a record-read apparatus that may be utilized to practice the invention.

FIG. 1 shows a mechanical arrangement of elements to record information on magnetic tapes. Magnetic tape 1 is flexibly supported by coacting rotatable guides 2 and 4, and passes over magnetic record-read head 3 positioned therebetween. Supersonic vibrator device 5, which may comprise a piezoelectric actuated vibrator, is connected to bar 6, which is vibratably moved up and down thereby, as indicated by direction arrow A. Bar 6 may comprise a T-shaped bar having shaft *6b* with arm *6a*, extending therefrom, substantially transversely coextensive to magnetic tape 1.

Figure 2:
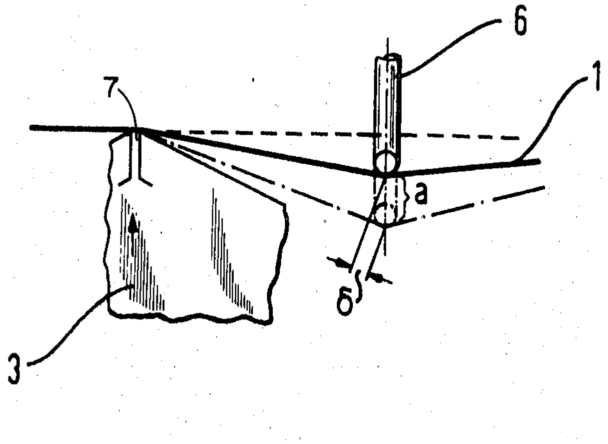
FIG. 2 is a sectional view of the record-read apparatus, and particularly the vibrator means which are operative during the read phase of operation.

The vibration of bar 6 functions to effect a simultaneous similar movement in tape 1. The amplitude of vibration or movement of bar 6, is illustrated in FIG. 2, wherein the vibration amplitude $a$ is illustrated in exaggerated form. The vibration of bar 6 produces a corresponding deviation $a$ in the position of magnetic tape 1, causing a slight forward-reverse movement of the magnetic tape 1. In a practical embodiment of the invention, the amplitude $\delta$ of the forward-reverse deviation or movement of magnetic tape 1 in direction B, is less than 0.5 $\mu$m. at the vibration frequency of $F_0=24$ kHz.

Alternatively to the T-shaped bar illustrated in FIGS. 1 and 2, a vibrating element which vibrates in the direction of the longitudinal axis of magnetic tape 1, that is in the direction illustrated by arrow B in FIG. 1, frictionally engaging magnetic tape 1, can be utilized to produce the desired forward-reverse movement about magnetic record-read head 3.

The recording apparatus illustrated in FIGS. 1 and 2 provides for recording individual information bits on successive magnetic tape segments. The tape is advanced to the next step by drive means after it is determined that the information bit has been correctly recorded, by reading and evaluating the recorded information bit.

During the read phase of operation, the magnetic tape segment is moved slightly in the forward and reverse directions about magnetic head slit 7, by vibrator arm **6*a*. This causes a signal to be induced in the magnetic head 3, which is amplified. However, since the amplitude of the longitudinal vibration of the magnetic tape is slight, the vibrator device 5** may continue to vibrate during the recording process, thereby eliminating time delays associated with actuating and deactuating the vibrator, without causing an unacceptable distortion resulting from recorded pulse width increase. In a practical form of the invention, the pulse width distortion is less than 1 percent at a rate of recording equal to 8 bit/mm.

After completion of the recording and supervisory reading, and the correction of an incorrectly recorded information bit, the magnetic tape is forwarded by one step by a synchronizing drive means, so that the next information bit may be recorded on the successive magnetic tape segment.

FIGS. 3, 4, 5, and 6, illustrate the operation of the invention, and particularly the conditions existing during individual steps 1–10. Within each individual step, a bit of information is recorded on a segment of the magnetic tape 1, indicative of a binary 0 or 1. Further, the recorded bit of information is read by a supervisory control device, which develops supervisory control signals indicative of the recorded bit, which may then be compared and analyzed with respect to the recording current, to determine if the bit of information has been correctly magnetically recorded.

Figure 5:
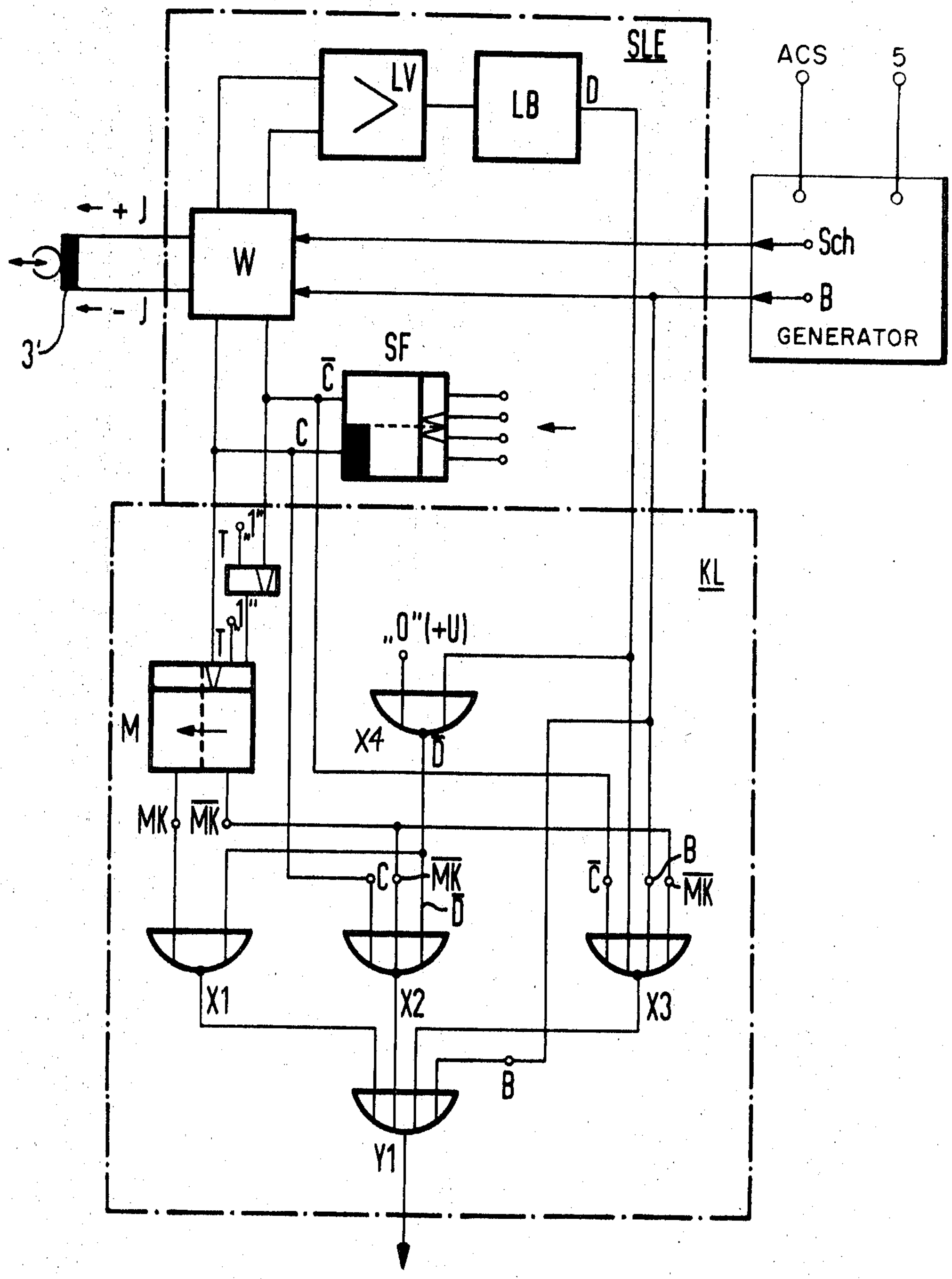
FIG. 5 is an electrical schematic diagram of the evaluation and logic circuits which determine if the information bit has been correctly recorded.

FIG. 5 illustrates the electronic record-read circuit, by which information bits are successively recorded, and the supervisory control signals are generated, and the analyzing means which determine if the information bit is correctly or incorrectly recorded. Record-read magnetic head 3′ is connected to recording-reading control system SLE. The information to be recorded is transmitted to recording flip-flop SF, and then fed to switch device W. If recording flip-flop SF feeds a binary 1 pulse over line C to switch device W, a current equal to +J is fed from the switch device to record-read magnetic head 3′; if reading flip-flop SF feeds a binary 1 pulse to switch device W over line $\overline{C}$, switch device W correspondingly feeds a current equal to −J to the record-read magnetic head 3′.

Figure 3:
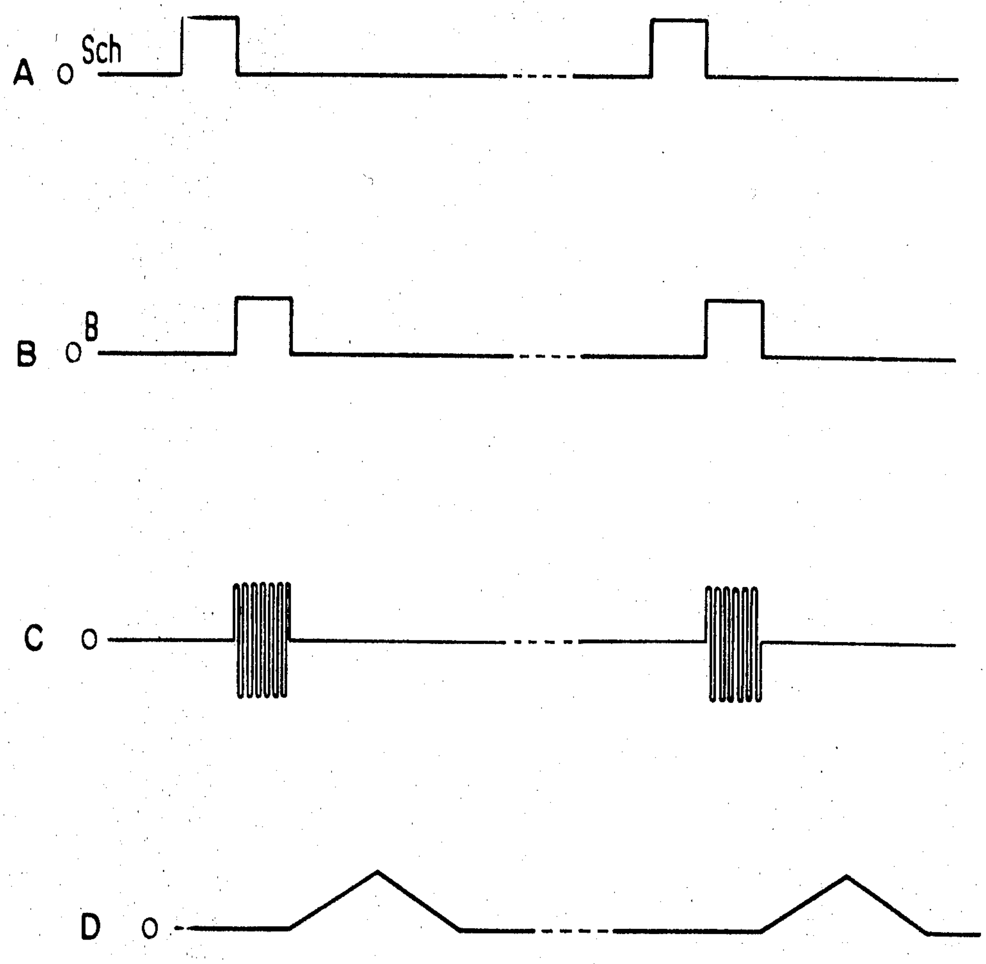
FIG. 3 comprises graphs A–D, and indicate the interrelated time intervals during which record, read, and advance signals are supplied to the record-read apparatus.

Switch device W is controlled by control pulses fed over control lines SCH and B. FIG. 3, graphs A–D illustrate in related time sequence the operation of the recording-reading structure illustrated in FIGS. 1 and 2, and controlled by the electronic circuitry illustrated in FIG. 5. Record command pulses are periodically developed and fed over line SCH actuating switch device W, to effect recording of the binary information transmitted by recording flip-flop SF. This is illustrated in graph A, FIG. 3. Thereafter, a read command pulse is fed over line B, to actuate switching device W, such that the recorded bit of information is read to develop supervisory control signals. This is illustrated in graphs B and C, which show that the read command pulse B follows the record command pulse SCH, to develop supervisory control signals LV. The read command pulse B, may synchronously actuate vibrator 5, illustrated in FIGS. 1 and 2, to engage vibrator arm **6*a* and magnetic tape 1, to effect the forward-reverse movement of magnetic tape 1, across the magnetic head 3. The forward-reverse movement of the magnetic tape segment 1 on which the bit of information has been recorded over the magnetic head causes an alternating supervisory control signal to be generated that is indicative of the recorded bit, and particularly its magnetization polarization. The supervisory control signal is then amplified by amplifier LV, and fed to evaluator LB which compares successive supervisory control pulses, and produces a binary 1 output signal D, when a magnetization change between the last two successive bits of information recorded is sensed. If a magnetization polarization change is not sensed, evaluator LB produces a binary 0 output signal D. Graph D of FIG. 3, shows the relative speed of the magnetic tape 1, which is driven by conventional drive means, during a specific time interval. Thus, during the record and read intervals, the magnetic tape is not advanced, although during the read time as determined by command control signals B, the magnetic tape segment on which the recorded bit of information is recorded is slightly vibrated. However, it is only after determination is made that the recorded signal is correct or, after it has been corrected, if incorrect, that magnetic tape 1** is advanced to another step. The increasing-decreasing speeds illustrated in graph D, respectively, indicate that the drive means initially speeds up, and then slows down, during the time interval in which the tape is advanced from one step to another. Generator G synchronously generates record and read command signals SCH and B, and generates an advance control signal ACS to advance the magnetic tape to the next successive segment, after the individual information bit has been correctly recorded.

Figure 4:
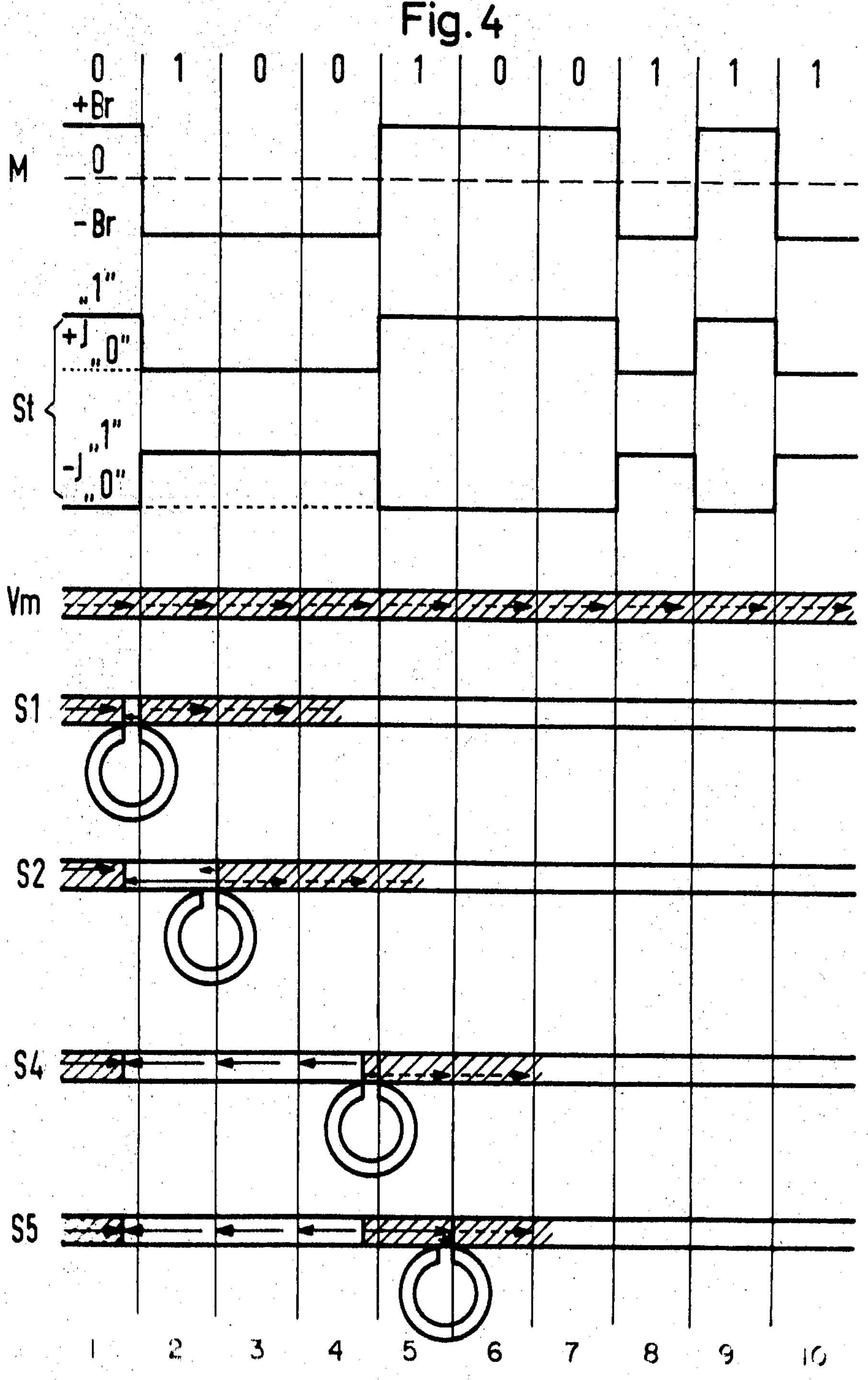
FIG. 4 comprises a series of graphs illustrating the magnetic polarization of magnetic tape segments during particular steps, depending upon the binary information being recorded.

FIG. 4 illustrates the initial remanent magnetization and remagnetization polarization of magnetic tape segments during specific steps. Assume, for example, that it is desired to successively record binary numbers 0 1 0 0 1 0 0 1 1 1. Recording flip-flop SF transmits the appropriate binary information over lines C and $\overline{C}$, as illustrated in the first and second graphs of FIG. 6 to switch device W, which feeds corresponding recording currents ST, comprising +J and −J components, to magnetic tape head 3′. Record command pulses SLH actuate switch device W so that the magnetic tape segment is magnetized by magnetic tape head 3′ to effect a magnetic polarization indicative of the binary bit of information.

Figure 6:
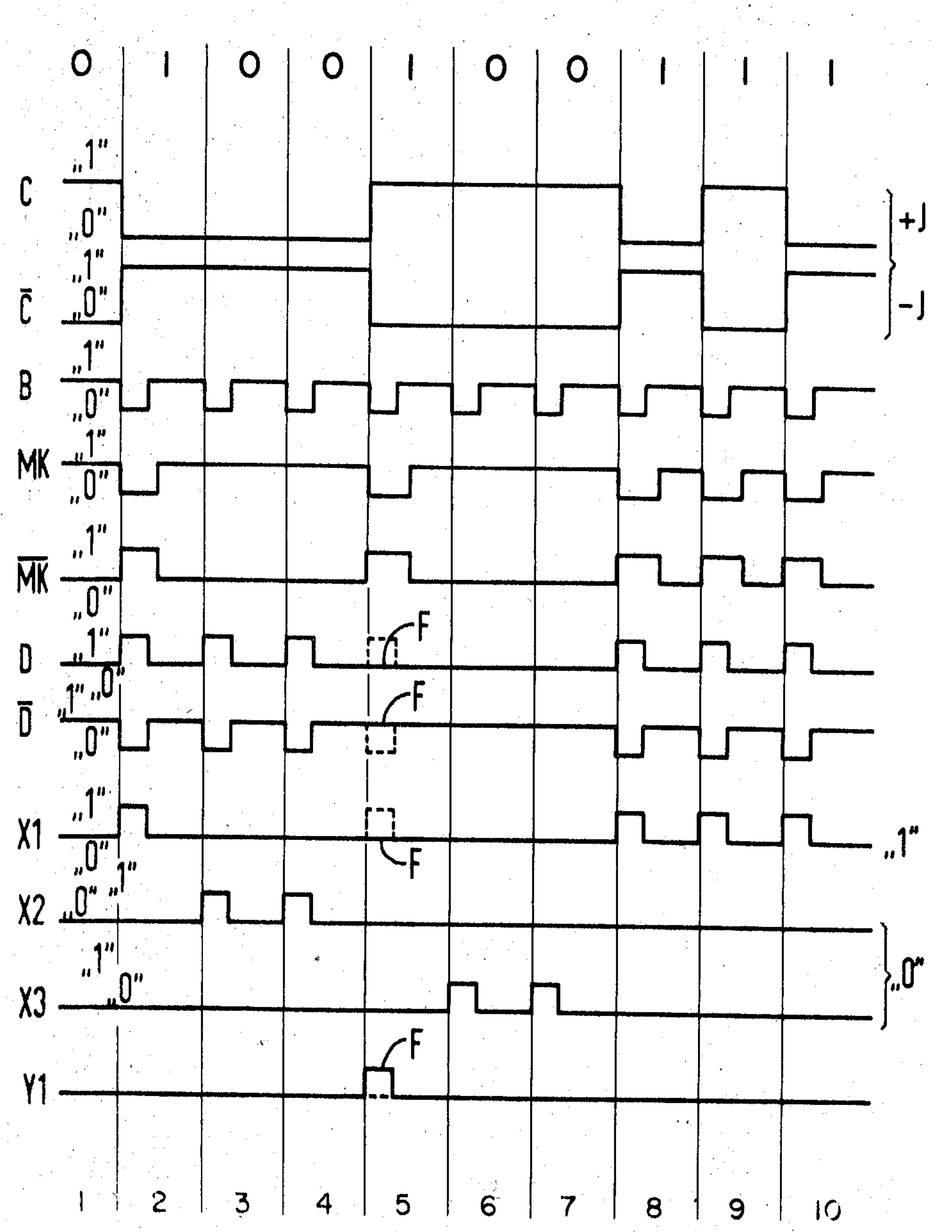
FIG. 6 comprises a series of graphs, which show the condition of various gates, and output lines thereof, during specific time intervals or steps.

Thus, graph M of FIG. 4, indicates the magnetic polarization and strength of magnetic tape segments, when the binary number indicated as recorded. As heretofore disclosed, the binary information comprising individual binary bits, is successively recorded during individual time intervals or steps. With reference to FIGS. 4 and 6, binary bits of information corresponding to binary numbers 0 1 0 0 1 0 0 1 1 1 are successively recorded during time steps 1–10, respectively, to serve as an illustration.

According to the NRZ-mark recording standard, magnetization strengths equal to +Br and −Br are utilized, and magnetic polarization reversal of successive magnetic tape segments occurs only when recording a binary 1. Further, assume that during the first step, the associated first magnetization segments is remagnetized to +Br, and that this is indicative of a binary 0. Under these conditions, the transition between the first and second steps, involves successive binary bits comprising binary 0 and binary 1.

Therefore, the transition from binary 0 to binary 1 must be indicated by remagnetization of the second magnetic tape segment to effect magnetic polarization thereof which is opposite to the magnetic polarization of the first magnetic segment.

With reference to FIG. 4, VM indicates the initial magnetic polarization resulting from remanent magnetism of the magnetic tape. It is therefore seen that the transition between steps 1 and 2 involves remagnetization of the magnetic tape in opposite magnetic polarity, by recording current ST. The bits of information recorded between steps 1 and 2 and steps 2 and 3, and between steps 3 and 4 comprise successive bit recordings of binary 1 and binary 0 and binary 0. Therefore, the magnetic tape is not repolarized oppositely by remagnetization, during steps 3 and 4. This is illustrated by the graph labeled S1 and S2 in FIG. 4.

However, the transition between steps 4 and 5, involves a transition between binary 0 and binary 1, and therefore requires that the magnetic tape be remagnetized to effect a reversal of magnetic polarization. This is illustrated by graph S4. The transition between steps 5 and 6 involves the transition between binary 1 and binary 0, which does not effect magnetic polarization reversal of successive magnetic tape segments. (FIG. 4, S5). The remaining bits of information are similarly recorded, according to the criteria set forth.

Appropriate logic circuitry can then be utilized to evaluate the recorded information illustrated in graph M of FIG. 4, in accordance with criteria of the NRZ-mark recording process, to determine the binary information.

FIG. 5 illustrates the associated recording-reading equipment utilized, which has been partly described. Prior to recording, the magnetic tape is initially magnetized to a predetermined remanent magnetic strength and polarization. Therefore, a magnetic polarization reversal may also be evaluated by evaluator LB, when reading current ST which is fed to the record-read magnetic head 3' produces a remagnetization of a magnetic tape segment during a particular step, which is oppositely polarized to the initial remanent magnetic polarization.

For example, assume that prior to recording the magnetic tape is initially magnetized to effect a remanent magnetic polarization indicated by the positive direction of graph M of FIG. 4. Then, remagnetization of a tape segment to be representative of a particular binary number, by recording current ST that repolarizes the segment oppositely to the remanent magnetic polarization, will cause evaluator LB to produce a binary 1 output. This is because evaluator LB, as previously discussed, produces a binary 1 output signal D, when it senses a magnetic polarization reversal between the recorded bit, and the magnetic polarization existing directly prior to recording the bit.

For example, this condition exists during step 3 of FIG. 4, assuming the remanent magnetization polarization direction to be positive. Then, because current ST causes remagnetization of the magnetic segment in an oppositely polarization direction, evaluator LB will sense a magnetic polarization reversal and will therefore produce an erroneous binary 1 output signal D. It is seen that this error will only exist, when recording a 0 because bit transitions from 0 to 1, and from 1 to 1, always effect magnetic polarization reversal.

Logic circuit KL operatively cooperates with the electronic recording-reading control circuit SLE, to indicate whether or not the information bits are correctly recorded. It comprises monostable flip-flop M, and NOR gates X1, X2, X3, X4, and Y1. The electrical control circuitry illustrated in FIG. 5, must satisfy the following conditions:

(1) When a binary 1 is correctly recorded, the supervisory control signal must be evalulated by LB to produce a binary 1 output at D. This is because any transition from 0 to 1 or from 1 to 1, effects a reversal in the magnetic polarization of the associated magnetic tape segment.

(2) When a binary 0 is recorded, the supervisory control signal should be evaluated by evaluator LB to produce a binary 0 output at D, if the recording current ST has magnetized the associated tape segment in the same polarization direction as the initial remanent magnetic polarization.

(3) If a binary 0 is recorded, the supervisory control signal must be evaluated by evaluator LB, to produce a binary 1 output at D, if recording current ST has magnetized the associated tape segment to effect a polarization direction opposite to the initial remanent magnetic polarization.

The output developed by evaluator LB at output D, is compared to the output signals developed by recording flip-flop SF, by supervisory logic control system KL, to provide additional criteria to correctly evaluate the significance of the supervisory control signals, and particularly to determine if the information bit has been correctly recorded.

The logic circuitry illustrated in FIG. 5 functions in the following manner. When recording flip-flop SF effects a recording current reversal indicative of a binary 1 information bit over lines C and $\overline{C}$ during a specific step as compared to the recording current during the prior step, monostable flip-flop M is switched to the unstable state for a time interval slightly longer than the supervisory reading time interval 0. This is illustrated in FIG. 6, step 2 where *b* represents the supervisory reading time interval, and *u* represents the time interval during which flip-flop circuit M is switched to the unstable condition. When this occurs, flip-flop M does not produce an output signal; that is, it produces a binary 0 output.

Monostable flip-flop M is connected to NOR gates X1, X2, X3, X4, and Y1, to produce a binary 1 output from Y1 when evaluator LB incorrectly evaluates a change in magnetic polarization between successive recorded information bits. Further, as explained above, it functions to prevent an incorrect evaluation of a reversal in magnetic polarization when during a specific step, the associated magnetic tape segment is remagnetized to a polarization direction opposite to the polarization direction of the initial remanent magnetization thereof.

Assume that binary 1 is to be recorded during a particular step, thereby effecting a reversal of the polarization of the magnetic tape segment, relative to the last recorded information binary bit. Then, the supervisory control signals should be evaluated by LB to produce a binary 1 at output D. NOR gate X4 functions as an inverter, to produce $\overline{D}$ at its outout. Under these conditions, $\overline{D}$ will equal binary 0. Further, MK will equal binary 0, since the magnetization polarization reversal, is effected by a change or reversal of the recording currents, developed by recording flip-flop SF thereby driving monostable flip-flop M to the unstable condition wherein MK equals binary 0. NOR gate X1 has two inputs, MK and $\overline{D}$. Under the conditions described, where both MK and $\overline{D}$ equal binary 0, NOR gate X1 will be closed; that is, it will produce a binary 1 output which is fed to the input of NOR gate Y1. If any of the inputs to NOR gate Y1 comprise binary 1, that is, if any are present, NOR gate Y1 will produce a binary 0 output; that is, it will remain open.

The conditions described are illustrated in FIG. 6 which involves a transition from binary 0 during step 1, to binary 1 during step 2. The corresponding conditions of NOR gates X2 and X3, as determined by their inputs, are also given (see Example 1, FIG. 7). When the output of NOR gate Y1 equals a binary 0, (when it is open) it is indicative of the fact that the information bit has been correctly recorded. NOR gate X1 will also produce a binary 1 output, during steps 8, 9 and 10, which also involve transitions during which the information bit to be recorded is a binary 1.

If in recording a binary 1, the magnetic polarization reversal does not occur, the supervisory control signals will cause evaluator LB to produce a binary 0 output at D. Then, output $\overline{D}$ from NOR gates X4 will equal binary 1, and MK will still equal binary 0; therefore NOR gate X1 will produce a binary 0 output. Further NOR gates X2 and X3 will also produce binary 0 outputs. This condition is illustrated in step 5 of FIG. 6 wherein the broken line pulse F designated in graphs D, $\overline{D}$, and X1, indicates the condition that would have existed had the information bit been correctly recorded. Further, NOR gates X2 and X3 will also produce binary 0 outputs, as illustrated in FIG. 6 (see Example 2, FIG. 7). Then, all of the inputs to Y1 will equal 0, closing NOR gate Y1 and producing a binary 1 output therefrom that is indicative of an incorrect recording of the information bit. When such an incorrect indication is given, there is still sufficient time during that specific step, to remagnetize the tape to effect correct recording of the information bit.

For example, it is seen with reference to FIG. 6, that the error signal Y1 comprises a small portion of the time interval during a specific step, and that recording currents ST are present thereafter. Therefore, the remaining time during the particular step can be utilized to effect correct recording of the information bit. For example, a binary 1 output from NOR gate Y1 may be utilized to trigger a second record command signal S*ch* during the same step. The magnetic tape is not advanced to the next step until the output from Y1 equals binary 0, indicating that the information bit has been correctly recorded. This can be achieved, for example, by synchronizing drive means 8 for the magnetic tape to be actuated upon an indication that a correct recording has been made.

Assume that binary 0 is to be recorded, and that there is a reversal in magnetic polarization of the magnetic tape segment from the initial remanent magnetic polarization. This is illustrated in FIG. 6, with reference to the transitions between steps 2 and 3, and 3 and 4.

Remagnetization of the magnetic tape segment during steps 3 and 4 will effect polarization reversal relative to the remanent magnetic polarization (which was assumed to be positive). Under these conditions, the polarization reversal would be evaluated by evaluator LB to produce an output D therefrom equal to binary 1, incorrectly indicating recording of a binary 1. However, a reversal in the recording current is not simultaneously effected. These conditions are illustrated in steps 3 and 4, representative of successive information bits of binary 1 and binary 0, and of binary 0 and binary 0, respectively. Since there is no change in polarity of the recording current, monostable flip-flop M will remain in the stable condition and produce an output; MK will therefore equal binary 1. With reference to NOR gate X2, and FIG. 6, the inputs to NOR gate X2 comprising C, M$\overline{K}$, and $\overline{D}$, will be binary 0, thereby closing NOR gate X2; that is, NOR gate X2 will produce a binary 1 output which is fed to NOR gate Y1. Since at least one of the inputs to NOR gate Y1 is present, NOR gate Y1 will remain open and will produce a binary 0 output, indicative of a correct recording of the information bit (see Example 3, FIG. 7).

Assume, however, that the information bit is incorrectly recorded, and that remagnetization of the magnetic tape during steps 3 and 4, effects magnetic polarization of the associated magnetic tape segments in the same direction as the initial remanent magnetic polarization (in the +Br direction). Then, evaluator LB will not sense a magnetic polarization reversal, and will produce an output D equal to binary 0. Under these conditions, NOR gates X1, X2, and X3 will all produce binary 0 outputs; that is, they will remain open (see Example 4). Therefore, NOR gate Y1, will have binary 0 inputs to all input lines, and will therefore produce a binary 1 output indicative of an incorrect recording of the information bit (see Example 4, FIG. 7).

Assume that a binary 0 is to be recorded, and that remagnetization of the associated magnetic tape segment is to effect no change in magnetic polarization relative to the initial remanent magnetic polarization of the magnetic tape segment. This is illustrated in FIGS. 4 and 6, during steps 6 and 7, which involve transitions from binary 1 to binary 0, and from binary 0 to binary 0, respectively. Then, the supervisory control signals will be evaluated by evaluator LB, to provide an output indication D equal to binary 0, correctly sensing that a magnetic polarization reversal has not occurred. Under these conditions NOR gate X3, will produce a binary 1 output, since its inputs $\overline{C}$, $\overline{K}$, D, and B, all equal binary 0. Since at least one of the inputs to NOR gate Y1 comprises a binary 1, NOR gate Y1 will produce a binary 0 output indicating that no error has occurred (see Example 5, FIG. 7).

Suppose, however, that the bit of information has been incorrectly recorded, and that remagnetization of the magnetic tape segment has occurred of opposite polarization to the initial remanent magnetic polarization. Then, supervisory control signals will be evaluated by evaluator LB, to produce a binary 1 output at D. Under these conditions NOR gates X1, X2, and X3 will produce binary 0 outputs, closing NOR gate Y1 to thereby produce a binary 1 output. This is indicative of an error (see Example 6, FIG. 7).

Therefore, it is seen that the logic circuit KL, and particularly NOR gates X1, X2, and X3, are indicative of the binary information recorded on the magnetic tape. Thus, when X1 equals binary 1, it is indicative of a binary 1 bit of information. When X2 equals binary 1, it is indicative of a transition from either binary 1 or binary 0, to binary 0, and of a magnetic polarization reversal from the initial remanent magnetic polarization. Finally, when X3 equals binary 1, it is indicative of a transition in the information being recorded from either binary 0 or binary 1, to binary 0, and of a magnetization polarization of the magnetic tape segment during the particular step in the same direction as the initial remanent magnetic polarization.

It is therefore possible to utilize the logic control circuitry KL to evaluate the recorded information bits. Setting the conditions existing during step 1 as the reference, and assuming that the positive M direction is indicative of the initial remanent magnetic polarization direction of the magnetic tape, evaluation of successive tape segments effects a proper reading of the information recorded. For example, the transition between steps 1 and 2 involves a reversal in magnetic polarization, and therefore, must be read as a 1. The transitions from step 2 to step 3, and from step 3 to step 4, effect no magnetic polarization reversal, and therefore, must be read as binary 0. The remaining bits of information recorded can be evaluated similarly.

What is claimed is:

1. A recording apparatus for statically recording individual bits of information on successive segments of a magnetic tape comprising:

- a magnetic head with a single coil (3; 3') operatively positioned adjacent the magnetic tape (1), having record and read phases of operation,
- a source of electrical signals (SF) operating in the NRZ mode indicative of the individual information bits,
- generator means providing time spaced record command (Sch) and read command (B) signals,
- switch means connected to the generator means and selectively actuated by a record command signal to connect the magnetic head (3; 3') to the source of electrical signals (SF), and actuate the magnetic head to the record phase of operation to magnetically record an individual information bit,
- a vibrator (6) operatively engaging the magnetic tape to vibratively move a portion of the magnetic tape segment on which an information bit is magnetically recorded to produce magnetic flux variations in the magnetic head, the vibrative movement of the magnetic tape being continuous in back and forth manner in the direction of magnetic tape travel,
- the switch means being selectively actuated by a read command to actuate the magnetic head to the read phase of operation, to induce supervisory electrical control signals in response to the magnetic flux variations, indicative of the recorded information bit, supervisory means (SLE; KL) connected to the magnetic head and the source of electrical signals to evaluate the supervisory control signals and the individual information bit to determine if the information bit has been correctly recorded.

2. A recording apparatus as recited in claim 1 further comprising:

correction means (Y1) connected to the supervisory means to effect a correct recording of an incorrectly recorded individual information bit on the same magnetic tape segment, when a determination is made that the individual bit is incorrectly recorded.

3. A recording apparatus as recited in claim 2 further comprising:

drive means (8) to advance the magnetic tape, to record the next individual information bit on the successive tape segment, following the correct recording of an individual information bit.

4. A recording apparatus as recited in claim 3 wherein the generator means (G) comprises a synchronizing generator connected to the vibrator (6) and the switch means (W), to synchronously actuate the vibrator and generate read command signals, the vibrator being actuated for at least a time interval equal to the duration of the read command signals.

5. A recording apparatus as recited in claim 4 wherein the synchronizing generator is connected to the drive means (8), to actuate the drive means and advance the magnetic tape.

6. A recording apparatus as recited in claim 2 wherein the vibrator comprises an arm (*6a*) arranged transversely to the longitudinal axis of the magnetic tape (1), adjacent to the magnetic head (3; 3′).

7. A recording apparatus as recited in claim 6 further comprising:

first (2) and second (4) rotatable support means flexibly supporting the magnetic tape therebetween, the magnetic head (3; 3′) positioned between the first and second rotatable support means.

8. A recording apparatus as recited in claim 7 wherein the vibrator comprises a shaft (*6b*) positioned substantially perpendicular to the surface of the magnetic tape, the arm (*6a*) extending therefrom, the vibrator vibrating along an axis (A) substantially parallel to the axis of the shaft.

9. A recording apparatus as recited in claim 2, wherein the vibrator frictionally engages the magnetic tape, and vibrates along an axis (B) parallel to the longitudinal axis of the magnetic tape.

10. A recording apparatus as recited in claim 1 wherein the supervisory means further comprises:

evaluator means (LB) to evaluate the supervisory control signals to determine if a reversal of magnetic polarization between successive segments occurs, and to generate an evaluating signal (D) indicative of the determination made, comparison means (KL) connected to the evaluator means to compare the evaluating signal and the individual information bit, to determine if the individual information bit is correctly recorded, and to generate a comparison signal indicative of the determination made, and the correction means (Y1) being connected to the comparison means and responsive to the comparison signal to effect a correct recording of an incorrectly recorded individual information bit on the same magnetic tape segment, when a determination is made that the individual bit is incorrectly recorded.

11. A process for statically recording individual bits of binary information on successive segments of a magnetic tape comprising:

recording in the NRZ mode an individual bit of information on a tape segment with a magnetic head having a single coil for recording and reading obtaining a recorded information bit, vibrating continuously a portion of the magnetic tape segment on which the individual information bit has been recorded in back and forth manner in the direction of tape travel to produce magnetic flux variations in the magnetic head, thereby generating supervisory control signals indicative of the recorded information bit, evaluating the supervisory control signals to determine if a reversal of magnetic polarization has taken place between the recorded information bit and the preceding recorded information bit, producing an indicating signal indicative of the determination made, comparing the indicating signal and the individual bit of binary information to determine if the individual information bit is correctly recorded, correcting an incorrectly recorded individual information bit on the same magnetic tape segment, and advancing the magnetic tape to the next magnetic tape segment when the individual information bit is correctly recorded, to record the next individual information bit thereon.

12. A recording apparatus for statically recording individual bits of information on successive segments of a magnetic tape comprising:

a magnetic head with a single coil (3; 3′) operatively positioned adjacent to the magnetic tape (1), having record and read phases of operation, a source of electrical signals (SF) indicative of the individual information bits, generator means providing time spaced record command (Sch) and read command (B) signals, switch means connected to the generator means and selectively actuated by a record command signal to connect the magnetic head (3; 3′) to the source of the signals, and actuate the magnetic head to the record phase of operation to magnetically record an individual information bit, a vibrator (6) operatively engaging the magnetic tape to vibratively move a portion of the magnetic tape segments on which an information bit is magnetically recorded to produce magnetic flux variations in the magnetic head, the vibrative movement of the magnetic tape being continuous in a back and forth manner in the direction of magnetic tape travel, the switch means being selectively actuated by a read command to actuate to the magnetic head to the read phase of the operation, to induce supervisory electrical control signals in response to the magnetic flux variations indicative of the recorded information bit, and supervisory means connected to the magnetic head and to the source of electrical signals to evaluate the supervisory control signals and the individual information bit to determine if the information bit has been correctly recorded, said supervisory means comprising:

evaluator means (LB) to evaluate the supervisory control signals to determine if a reversal of magnetic polarization between successive segments occurs, and to generate an evaluating signal (B) indicative of the determination made, comparison means (KL) connected to the evaluator means to compare the evaluating signal and the individual information bit, to determine if the individual information bit is correctly recorded, and to generate a comparison signal indicative of the determination made, and correction means (Y1) connected to the comparison means and responsive to the comparison signal to effect a correct recording of an incorrectly recorded individual information bit on the same magnetic tape segment when a determination is made that the individual bit is incorrectly recorded.

References Cited

UNITED STATES PATENTS

| | | | |
|---|---|---|---|
| 3,243,789 | 3/1966 | Ragle | 340—174.1 |
| 3,359,548 | 12/1967 | Yoshii et al. | 340—179.1 |
| 2,625,607 | 1/1953 | Eckert et al. | 179—100.2 |

FOREIGN PATENTS

| | | | |
|---|---|---|---|
| 850,963 | 10/1960 | Great Britain | 179—100.2 |

BERNARD KONICK, Primary Examiner

WILLIAM F. WHITE, Assistant Examiner

U.S. Cl. X.R.

179—100.2